United States Patent
Boudikian et al.

(10) Patent No.: US 10,433,395 B2
(45) Date of Patent: Oct. 1, 2019

(54) DEVICE FOR DRIVING THE ELECTRICAL POWER SUPPLY OF LIGHT SOURCES OF AN AUTOMOTIVE VEHICLE

(71) Applicant: VALEO VISION, Bobigny (FR)

(72) Inventors: David Boudikian, Bobigny (FR); Jean-Philippe Alves, Bobigny (FR); Bernard Guillot, Bobigny (FR); Irantzu Jauregi, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/880,921

(22) Filed: Jan. 26, 2018

(65) Prior Publication Data
US 2018/0213619 A1 Jul. 26, 2018

(30) Foreign Application Priority Data
Jan. 26, 2017 (FR) ...................................... 17 50624

(51) Int. Cl.
| | |
|---|---|
| *H05B 37/02* | (2006.01) |
| *H05B 33/08* | (2006.01) |
| *H02M 3/156* | (2006.01) |
| *H02M 1/00* | (2006.01) |

(52) U.S. Cl.
CPC .......... *H05B 33/089* (2013.01); *H02M 3/156* (2013.01); *H05B 33/0815* (2013.01); *H05B 33/0845* (2013.01); *H02M 2001/0022* (2013.01)

(58) Field of Classification Search
None
See application file for complete search history.

(56) References Cited

U.S. PATENT DOCUMENTS

| | | |
|---|---|---|
| 2006/0126367 A1 | 6/2006 | Hesterman |
| 2014/0368122 A1 | 12/2014 | Mitterbacher et al. |
| 2016/0064951 A1* | 3/2016 | Yamamoto ............... H02J 17/00 |
| | | 307/104 |
| 2016/0344403 A1 | 11/2016 | Sonnaillon |
| 2017/0187292 A1* | 6/2017 | Schaemann ............ G01R 23/02 |
| 2018/0139811 A1* | 5/2018 | Ekbote ............... H05B 33/0815 |

FOREIGN PATENT DOCUMENTS

DE  10 2012 203 745 A1   6/2013

OTHER PUBLICATIONS

French Preliminary Search Report dated Sep. 29, 2017 in French Application 17 50624, filed on Jan. 26, 2017 (with English Translation of Categories of cited documents).

* cited by examiner

*Primary Examiner* — Wei (Victor) Chan
*Assistant Examiner* — Henry Luong
(74) *Attorney, Agent, or Firm* — Oblon, McClelland, Maier & Neustadt, L.L.P.

(57) ABSTRACT

The invention provides a device for driving the electrical power supply of at least one electronic circuit branch comprising at least one light source of an automotive vehicle. A converter circuit converts an input voltage $V_{IN}$ into a load voltage (or current) that is applied to said circuit branch, and control means are configured to control the converter circuit by means of a periodic PWM signal having a predetermined frequency f. The frequency f is adapted in real time and according to a disruption that is detected in the input voltage signal $V_{IN}$ in order to avoid any occurrence of flickering in the intensity of the luminous flux emitted by the light sources.

17 Claims, 1 Drawing Sheet

DEVICE FOR DRIVING THE ELECTRICAL POWER SUPPLY OF LIGHT SOURCES OF AN AUTOMOTIVE VEHICLE

The invention pertains to the field of the electrical power supply of light sources of an automotive vehicle. In particular, the invention relates to light sources the intensity of the luminous flux of which can be adjusted by means of a pulse-width-modulation signal.

It is becoming increasingly common to use semiconductor element light sources, such as light-emitting diodes (LEDs), to perform various lighting functions of a vehicle. These functions may, for example, include daytime running lights, position lights, turn indicators or low beam lights. As is known, a device for driving the electrical power supply is needed to supply power to a group of LEDs performing a given lighting function. Such a driver device generally comprises a converter that, on the basis of a DC input voltage delivered by a source that is internal to the vehicle, such as a battery, is capable of generating an output voltage having a value that is suitable for supplying power to the group of LEDs. An LED emits light when a voltage that is at least equal to a threshold value, referred to as direct voltage, is applied to its terminals. The intensity of the luminous flux emitted by an LED generally increases with the average intensity of the electric current flowing therethrough, above the threshold value for the direct current.

Known converter types comprise SEPIC (single-ended primary-inductor converter), flyback, boost and buck converters. Such converters involve a switch element, such as a transistor, the state of which is periodically switched between the open and closed values. The switching frequency applied to the switch affects the value of the output voltage and the average value of the output current.

It is also known practice to adjust the luminous intensity of light sources powered in this way, by applying a PWM (pulse-width-modulation) signal having a given duty cycle and a given peak current to the switched-mode converter. The frequency of the pulse-width-modulation signal and the duty cycle of this signal have an effect on the electric current flowing through the light sources. By adapting the frequency of the pulse-width-modulation signal or the duty cycle thereof, a predetermined average current intensity may thus be obtained at the converter. This means, at the level of the powered light sources, that a luminous flux having an intensity that corresponds to the average intensity of the current flowing therethrough is emitted. The higher the average intensity of the current flowing through the light sources, the higher the intensity of the luminous flux emitted by the light sources. The frequency or the duty cycle of the PWM signal therefore makes it possible to perform a function of attenuating the luminous flux emitted by the light sources.

However, it is observed that, if the input voltage of the converter is subject to disruptions, having, for example, a frequency between 100 and 1000 Hz and an amplitude that may reach 5 V, the output power supply of the converter becomes subject to substantial ripple and the intensity of the luminous flux emitted by the light sources is no longer uniform in appearance, but is subject to undesirable visible flickering.

The aim of the invention is to overcome at least one of the problems posed by the prior art. In particular, the aim of the invention is to provide a device for driving the electrical power supply of light sources that are controlled by a PWM signal for performing a function of attenuating the luminous flux emitted by the light sources, which is robust with respect to periodic disruptions in the input voltage delivered to the device, and which eliminates the visible flickering of the luminous flux in solutions known from the prior art.

The subject of the invention is a device for driving the electrical power supply of at least one electronic circuit branch comprising at least one light source of an automotive vehicle. The device comprises a converter circuit that is configured to convert an input power supply, and in particular an input voltage, into an output power supply, and in particular a load voltage or current, which is applied to said circuit branch, and control means that are configured to control the converter circuit by means of a periodic signal S having a predetermined frequency f. The device is noteworthy in that it comprises:
- detecting means that are configured to detect a disruption in the input voltage, and to determine the frequency $f_p$ of this disruption; and
- adapting means that are configured to modify the frequency of said periodic signal S according to the detected frequency $f_p$ of the disruption.

Advantageously, the detecting means may be configured to determine variations in the detected frequency $f_p$ of the disruption.

Advantageously, the adapting means are configured to modify the frequency of the periodic signal S directly according to the frequency $f_p$ of the disruption.

Preferably, the device furthermore comprises comparing means that are configured to compare the detected frequency $f_p$ of the disruption with the predetermined frequency f of said periodic signal, and the adapting means are configured to modify the frequency of said periodic signal according to the result of said comparison.

Preferably, the detecting means may be configured to generate a binary periodic signal having substantially the detected frequency, and to transmit the binary periodic signal to the comparing means.

The detecting means may preferably comprise an electronic circuit.

Preferably, the device may comprise a programmed microcontroller element for the comparing and/or adapting means.

The adapting means may preferably be configured to modify the frequency of said periodic signal if the difference between the compared frequencies is smaller than a predetermined threshold. The predetermined threshold for the difference may preferably be comprised between 200 and 500 Hz.

Preferably, the periodic signal may be modified so that its frequency does not correspond substantially to the detected frequency of the disruption signal, or to harmonic frequencies of the latter.

Preferably, the converter circuit may be a SEPIC (single-ended primary-inductor converter) switched-mode circuit.

The periodic signal S that is generated by the control means may preferably be a pulse-width-modulation signal, which is intended to control the intensity of the luminous flux emitted by the light sources.

Another subject of the invention is a lighting module for an automotive vehicle comprising at least one light source and a device for driving the electrical power supply of the light source. The module is noteworthy in that the driver device is in accordance with the invention.

Preferably, the light sources may be light-emitting semiconductor element sources. They may be light-emitting diodes (LEDs), or laser diodes, for example.

The device according to the invention makes it possible to drive the electrical power supply of light sources by means of a converter circuit in a way that is robust with respect to disruptions in the DC voltage delivered at the input of the converter circuit. This robustness results in particular in the obtainment of a luminous flux that is uniform and constant over time in appearance when a periodic signal disrupts the input voltage.

Other features and advantages of the present invention will be better understood with the aid of the exemplary description and the drawings, in which.

Unless specified otherwise, technical features that are described in detail for one given embodiment may be combined with the technical features that are described in the context of other embodiments described by way of non-limiting example.

Figure 1:
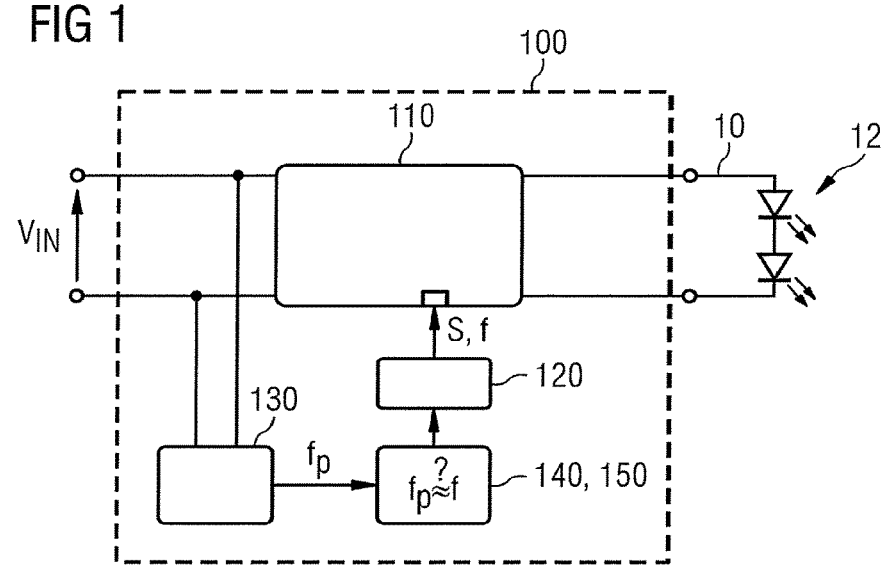
FIG. 1 is a schematic illustration of a device according to one preferred embodiment of the invention.

FIG. 1 shows a device 100 for driving the electrical power supply of an electronic circuit branch 10. The branch comprises, by way of non-limiting example, an assembly of two light-emitting diodes (LEDs) 12 in series. The device comprises a converter circuit 110 that is arranged to convert an input voltage $V_{IN}$ into a load voltage or current, the value of which is suitable for supplying power to all of the LEDs 12 of the branch 10 that is connected as a load. The input voltage $V_{IN}$ is preferably a DC voltage that is delivered, for example, by a battery that is internal to the automotive vehicle, which vehicle is provided with the device 100. The converter circuit 110 is a switched-mode circuit known per se in the art. The operation of such a converter circuit will not be described in detail in the context of the present invention. It is, for example, a boost converter circuit, a buck converter circuit, or a SEPIC (single-ended primary-inductor converter) circuit. In such converter circuits, the switching frequency affects the value of the output voltage.

The device 100 also comprises control means 120 that are arranged to control the converter circuit 110 using a periodic signal S, such as, for example, a pulse-width-modulation (PWM) signal. The frequency of the signal directly affects the average intensity of the electric current delivered by the converter 110 to the load branch 10. Since the intensity of the luminous flux emitted by the sources 12 of the branch 10 is an increasing function of the average intensity of the current flowing therethrough, this configuration makes it possible to perform a light-attenuating function that depends on the frequency f of the signal S delivered by the control means. According to one advantageous embodiment, the control means 110 are produced using a microcontroller element programmed for this purpose.

The converter circuit is configured to take a DC voltage, or a voltage that is substantially DC (having very low frequency disruptions), $V_{IN}$. However, it is possible for the voltage signal $V_{IN}$ to be disrupted by parasitic signals. The disruption may be introduced intentionally, for example when testing the device 100, or accidentally, due to a disruptive electronic element that is external to the device 100 and to the voltage source that delivers $V_{IN}$. Without other measures and as is known, when the activation duty cycle of the converter is short, the feedback control loop of the converter circuit is too slow to adapt to the disruption, which is consequently reflected in the output voltage/current.

The device comprises detecting means 130 having, as input, the voltage signal $V_{IN}$ and, as output, the frequency $f_p$ of a potential disruption detected in the signal $V_{IN}$. The signal $V_{IN}$ should, in the absence of disruptions, be substantially constant. The output of the detecting means 130 may also comprise a signal that is representative of the frequency of a detected disruption.

Figure 2:
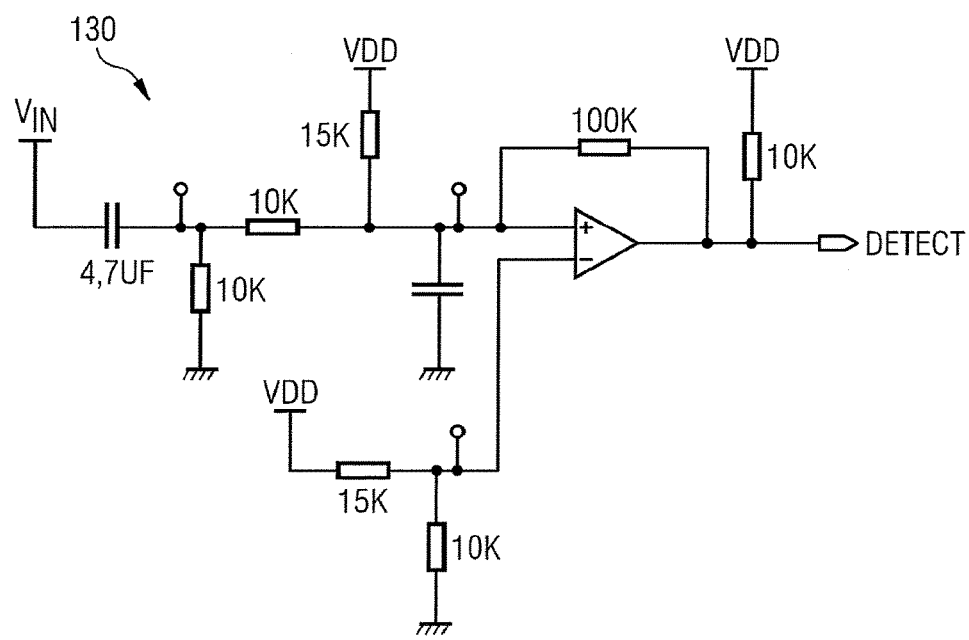
FIG. 2 is a circuit diagram showing the detecting means according to one preferred embodiment of the invention.

Purely by way of non-limiting example, FIG. 2 shows a circuit diagram that is used for the detecting means 130. The output terminal is denoted by the word "DETECT". The output signal is equivalent, in this case, to a binary signal of square appearance, the frequency of which is the frequency $f_p$ of the disruption in the input signal $V_{IN}$. Of course, other embodiments of the detecting means 130 are within the competence of a person skilled in the art. As long as the described functionalities are observed, alternative solutions do not depart from the scope of the present invention.

As shown in FIG. 1, the disruption frequency $f_p$ detected by the detecting means 130 is delivered as input to comparing means 140. The comparing means 140 are preferably produced by a microcontroller element. They have access to the value f of the signal S, with the aid of which the converter circuit 110 is controlled. Access to this frequency value is, for example, allowed by linking the microcontroller 140 to the microcontroller 120, by using a shared memory element, or by incorporating the control and comparing means within one and the same microcontroller element. The comparing means 140 are configured to compare the predetermined frequency f of the signal s with the disruption frequency $f_p$ detected by the detecting means 130. Similarly, the comparing means may be configured to compare a signal of square appearance having a frequency f with a signal of square appearance having a frequency $f_p$. When the absolute value of the difference between the two compared frequencies is lower than a predetermined threshold value, the adapting means 150, which may, by way of example, be produced by the same microcontroller element as the comparing means 140, are used to modify the frequency f of the signal S. The threshold value is advantageously stored in a memory element and is located, for example, between 200 and 500 Hz. If the frequency $f_p$ corresponds substantially to the frequency f or to one of the harmonic frequencies of the frequency f, the adapting means are configured to change the frequency f so that the difference between the adapted frequency $f_a$, which is the adapted version of the frequency f of the signal S, and the disruption frequency $f_p$ is higher than the predetermined threshold value. Alternatively, the adapted frequency $f_a$ is not substantially equal to the frequency f or to one of the harmonic frequencies of the latter. Consequently, the control means 120 adapt the frequency of the control signal S by using the frequency $f_a$ that is adapted in this way. It has been observed that these measures according to the invention make it possible to detect periodic disruptions in the input voltage signal $V_{IN}$ in real time, and to adapt the frequency of the signal S so as to avoid any apparent flickering effect in the intensity of the luminous flux emitted by the light sources 12.

The invention claimed is:

1. A device for providing electrical power to at least one electronic circuit branch comprising at least one light source of an automotive vehicle, the device comprising:

a converter circuit configured to convert a constant direct current (DC) input voltage $V_{IN}$ into a load voltage, which is applied to said at least one circuit branch;

control means configured to generate a periodic signal S having a frequency f and to provide the periodic signal S to the converter circuit;

detecting means connected to the input voltage $V_{IN}$ in parallel with the converter circuit and configured to detect a disruption in the input voltage $V_{IN}$, and to determine a frequency $f_p$ of the disruption; and adapting means configured to modify the frequency f of said periodic signal S according to the determined frequency $f_p$ of the disruption.

2. The device according to claim 1, wherein said device furthermore comprises comparing means configured to compare the determined frequency $f_p$ of the disruption with the frequency f of said periodic signal S, and the adapting means are configured to modify the frequency f of said periodic signal S according to said comparison.

3. The device according to claim 2, wherein the detecting means are configured to generate a binary periodic signal having the determined frequency $f_p$, and to transmit the binary periodic signal to the comparing means.

4. The device according to claim 2, wherein the adapting means are configured to modify the frequency f of said periodic signal S if the difference between the determined frequency $f_p$ and the frequency f is smaller than a predetermined threshold.

5. The device according to claim 1, wherein the detecting means comprise an electronic circuit.

6. The device according to claim 1, wherein the device comprises a programmed microcontroller element for the comparing and/or adapting means.

7. The device according to claim 1, wherein the periodic signal S that is generated by the control means is a pulse-width-modulation signal, which is intended to control intensity of luminous flux emitted by the at least one light source.

8. A lighting module for an automotive vehicle comprising at least one light source and a device for providing electrical power to the at least one light source, wherein the device comprises:
   a converter circuit configured to convert a constant direct current (DC) input voltage $V_{IN}$ into a load voltage, which is applied to said at least one circuit branch;
   control means configured to generate a periodic signal S having a frequency f and to provide the periodic signal S to the converter circuit;
   detecting means connected to the input voltage $V_{IN}$ in parallel with the converter circuit and configured to detect a disruption in the input voltage $V_{IN}$, and to determine a frequency $f_p$ of the disruption; and
   adapting means configured to modify the frequency f of said periodic signal S according to the determined frequency $f_p$ of the disruption.

9. The lighting module according to claim 8, wherein the at least one light source is a light-emitting semiconductor element source.

10. The device according to claim 8, wherein the detecting means comprise an electronic circuit.

11. The device according to claim 8, wherein the device comprises a programmed microcontroller element for the adapting means.

12. The device according to claim 8, wherein the adapting means are configured to modify the frequency f of said periodic signal S if a difference between the determined frequency $f_p$ and the frequency f is smaller than a predetermined threshold.

13. The device according to claim 2, wherein the periodic signal S that is generated by the control means is a pulse-width-modulation signal, which is intended to control intensity of luminous flux emitted by the at least one light source.

14. A lighting module for an automotive vehicle comprising at least one light source and a device for providing electrical power to the at least one light source, wherein the device comprises:
   a converter circuit configured to convert a constant direct current (DC) input voltage $V_{IN}$ into a load voltage, which is applied to said at least one circuit branch;
   control means configured to generate a periodic signal S having a frequency f and to provide the periodic signal S to the converter circuit;
   detecting means connected to the input voltage $V_{IN}$ in parallel with the converter circuit and configured to detect a disruption in the input voltage $V_{IN}$, and to determine a frequency $f_p$ of the disruption;
   comparing means configured to compare the determined frequency $f_p$ of the disruption with the frequency f of said periodic signal S; and
   adapting means configured to modify the frequency f of said periodic signal S according to the comparison.

15. The device according to claim 14, wherein the detecting means comprise an electronic circuit.

16. The device according to claim 14, wherein the device comprises a programmed microcontroller element for the comparing and/or adapting means.

17. The device according to claim 14, wherein the adapting means are configured to modify the frequency f of said periodic signal S if a difference between the determined frequency $f_p$ and the frequency f is smaller than a predetermined threshold.

* * * * *